(No Model.)

J. G. EBERHARD.
HARNESS TRIMMING.

No. 313,189. Patented Mar. 3, 1885.

Witnesses
Harry L. Beatty.
Chas. F. Day.

Inventor
John G. Eberhard
By Bradford Howland
Attorney

UNITED STATES PATENT OFFICE.

JOHN GEORGE EBERHARD, OF AKRON, OHIO.

HARNESS-TRIMMING.

SPECIFICATION forming part of Letters Patent No. 313,189, dated March 3, 1885.

Application filed August 29, 1884. (No model.)

*To all whom it may concern:*

Be it known that I, JOHN G. EBERHARD, a citizen of the United States, residing at Akron, in the county of Summit and State of Ohio, have invented a new and useful Improvement in Harness-Trimmings, of which the following is a specification.

My invention relates to harness-trimmings—such as terrets, rings, loops, and buckles—consisting in part of glass or porcelain for the purpose of rendering them more durable, and presenting a smooth wearing-surface for the leather, as well as to avoid liability to rust and loss of luster.

Figure 1:
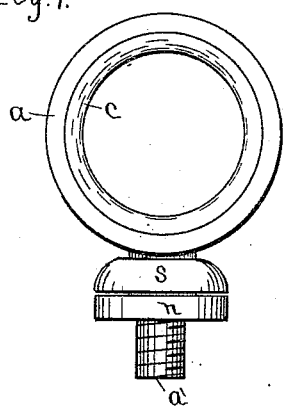
Figure 2:
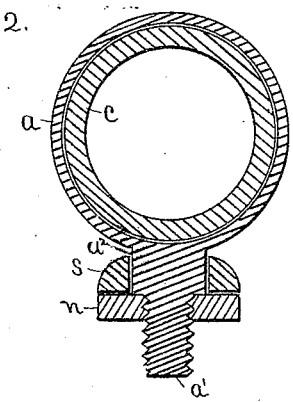
Figure 3:
Figure 4:
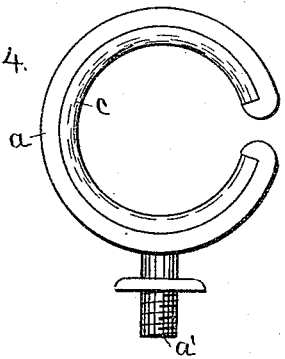

In the drawings forming a part of this specification, Figure 1 represents a terret with a glass lining. Fig. 2 is a vertical section of the same. Fig. 3 is a cross-section of the same; and Fig. 4 represents a hook-terret with a glass lining.

The metallic terret $a$ is formed with a recessed or grooved inner circumference to receive and retain the glass lining $c$. Its shank $a'$ is shouldered at $a^2$ to receive a glass collar, $s$. Below the shoulder it is threaded for nut $n$, which is screwed on the shank up to the shoulder, to loosely retain the glass collar $s$ in place. Shank $a'$ is split in order that the glass lining $c$ may be placed in the recessed circumference of terret $a$ after spreading apart the two sections of the shank, before nut $n$ and glass collar $s$ are placed on the shank. Terret $a$ may be made of cast metal, and then sawed lengthwise through the shank.

In placing the glass lining in the hook-terret the two ends of the hook are first to be spread apart, and then, after inserting the glass lining, bent together to retain it. A strip of leather or rubber may be placed between the metallic part of the trimming and its glass lining, to decrease the liability of breaking the glass. By similarly forming the metallic part of a terret, ring, loop, or buckle with a groove or recess on the outside adapted to receive and retain the glass, the latter may be used on the outside of the trimming when desired more for ornamental than wearing purposes.

I claim as my invention—

1. A harness-terret provided with a glass or porcelain collar, $s$, loosely retained on the shank of the terret by and in combination with screw-nut $n$ on the screw-threaded part of the terret-shank, substantially as described.

2. A harness-terret consisting of metal, in combination with glass or porcelain, the metallic part $a$ being formed with a split shank, $a'$, substantially as described.

JOHN G. EBERHARD.

Witnesses:
F. M. ATTERBOLT,
N. P. GOODHUE.